United States Patent

[11] 3,589,212

| [72] | Inventor | Ernst Marcus<br>Casilla 258, La Paz, Bolivia |
|---|---|---|
| [21] | Appl. No. | 790,700 |
| [22] | Filed | Jan. 13, 1969 |
| [45] | Patented | June 29, 1971 |

[54] STEPLESS VARIABLE TRANSMISSION WITH VIBRATION DAMPING
1 Claim, 3 Drawing Figs.

[52] U.S. Cl............................................... 74/793
[51] Int. Cl............................................... F16h 3/44
[50] Field of Search.................................. 74/793, 804, 796, 803

[56] References Cited
UNITED STATES PATENTS

| 787,080 | 4/1905 | Conant........................... | 74/793 |
| 2,012,629 | 8/1935 | Huppmann...................... | 74/796 X |
| 3,442,158 | 5/1969 | Marcus........................... | 74/796 |

FOREIGN PATENTS

| 835,242 | 5/1960 | Great Britain................ | 74/804 |
| 414,289 | 7/1946 | Italy............................ | 74/803 |

*Primary Examiner*—Carlton R. Croyle
*Assistant Examiner*—Thomas C. Perry
*Attorney*—Hurvitz, Rose and Greene ABSTRACT: Gear reduction is achieved between two cooperating inner and outer ring gears, the inner one of which is positioned for eccentric rotation relative to the outer gear, the toothed surfaces of the gears being conically shaped and arranged for relative axial motion with continuous contact therebetween, such that the outer gear presents a variable diameter of meshing surface to the inner gear as the two gears undergo relative axial movement. Vibration resulting from eccentricity of rotation and the mass of the rotating gear or gears, is counteracted by a variably positioned mass arranged to undergo displacement transverse to the system axis according to the degree of eccentricity between the two gears.

INVENTOR.
KENNETH R. DOUGLAS

STEPLESS VARIABLE TRANSMISSION WITH VIBRATION DAMPING

BACKGROUND OF THE INVENTION

The field of mechanical power transmission via gear trains, to which this invention is directed, has been advanced in the past by gear reduction arrangements employing stepless variable or continuously variable transmission configurations.

One significant improvement in stepless variable transmissions is disclosed in my copending U. S. Pat. application Ser. No. 624,911, filed Mar. 21, 1967, now U. S. Pat. No. 3,442,158.

In the invention presented in that application, the stepless variable transmission includes a pair of ring gears, one of which is cut on the conical inner surface of a tubular member and the other of which is cut on the cooperating outer conical surface of a disclike member. The disc member has a smaller outer diameter than the inner diameter of the thicker tubular member, and is arranged to rotate within and in partial engagement with the tubular member, undergoing eccentric rotation relative to the axis of the latter. As the two gears undergo relative rotation their coupling is such that they may also move relative to one another in an axial or longitudinal direction. In that manner, the effective diameters of the two gears may be varied relative to one another, or in other words, a differing diameter of outer gear may be presented to the mating surface of the inner gear, to permit variation of the ratio of reduction of the gears according to the expression $$2(D_o - D_i)/D_i$$

where $D_o$ and $D_i$ are the effective diameters of outer gear and inner gear, respectively.

The difference in effective diameters of the two gears may be reduced to a very small value by only slight longitudinal movement of one gear relative to the other, and therefore it is possible to vary the output speed of the power train within wide limits in smooth continuous fashion over an extremely short time interval.

While my previous stepless variable transmission operates in a perfectly suitable manner for many applications, I have found that in some applications undesirable or excessive vibration may occur as a result of the high speed eccentric displacement of the inner gear within the outer gear. This will be especially severe where the mass of the inner gear is large and the eccentricity, or displacement between axes, is substantial.

Accordingly, my present invention contemplates, as its primary objective, the elimination of this potentially dangerous vibration irrespective of the type of practical application of the transmission, or of the degree of eccentricity of rotation of the gears, or of the mass of the inner gear, and the accomplishment of this objective by the use of means which are simple and effective and which will not interfere with the operation or primary function of the transmission system.

SUMMARY OF THE INVENTION

Consistent with the above objective, I propose to provide a counterweight or countermass operating along a variable length rotatable arm to counteract the vibrational effect imposed by the eccentric mass of the inner gear. In essence, the position of the countermass varies directly with the location of the center of mass of the eccentrically moving gear and its associated cardanic connections, and is always at a point virtually diametrically opposite that center of mass along a line through the axis of the outer gear.

BRIEF SUMMARY OF THE DRAWING

In describing the structure and operation of my present invention and its relationship to and cooperation with my previous invention, I will refer to the accompanying drawing, to which the reader's attention is directed to enable him to gain a more complete understanding of the invention. In this respect, it may also be helpful to consider the disclosure of my aforementioned patent, although this is not essential to an understanding of this invention. In the accompanying drawing.

FIG. 3 is a side view, partly in section, of the transmission of FIG. 1, illustrating the change in position of the compensating structure at the point of greatest eccentricity of the gears.

DESCRIPTION OF THE PREFERRED EMBODIMENT

Figure 1:
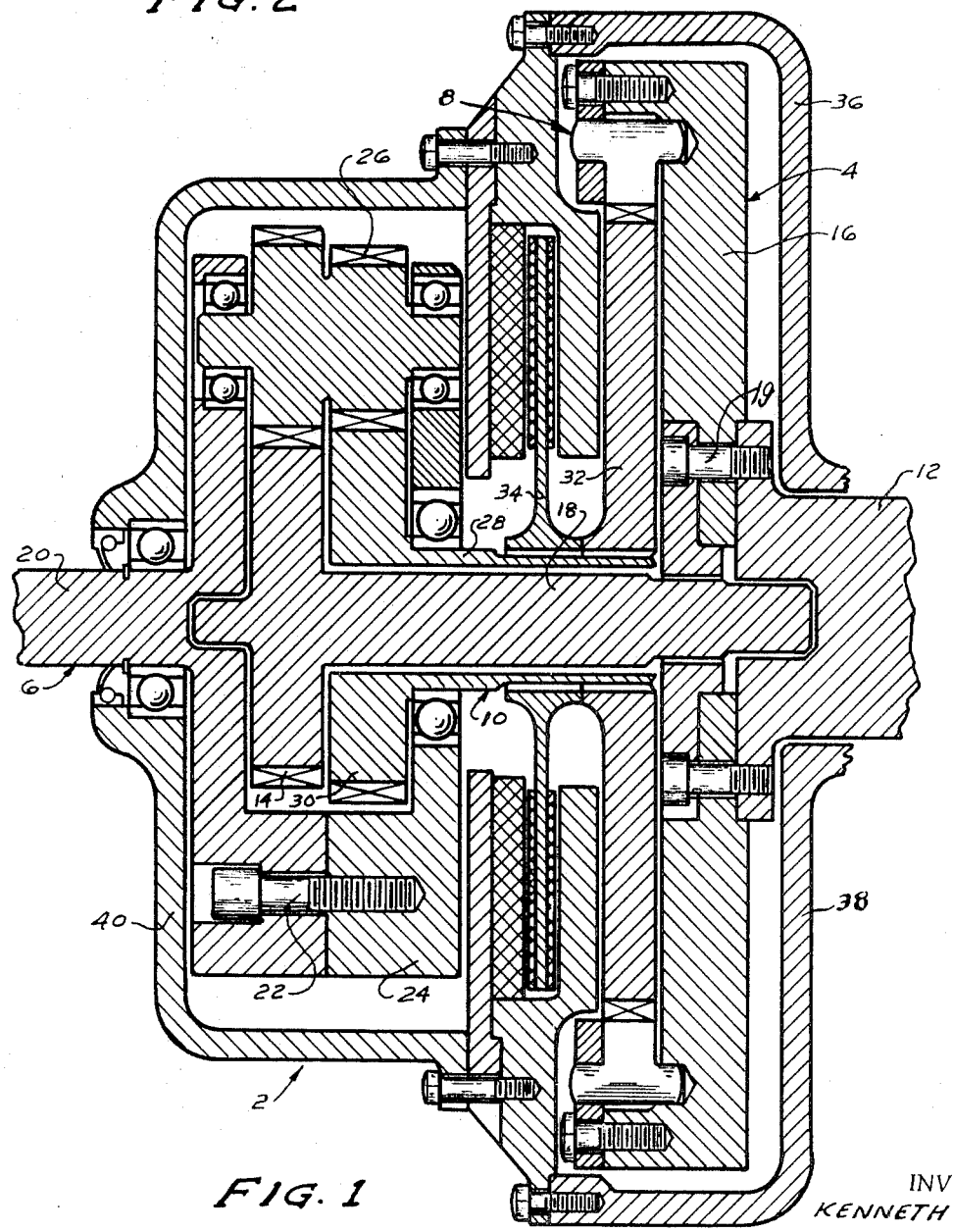
FIG. 1 is a fragmentary plan view of the cooperating gears and a portion of their coupling connection.

The stepless variable transmission includes an outer ring gear 10 and an inner ring gear 12 (FIGS. 1 and 2), the former having a longitudinal axis 17 from which the axis 15 of the inner gear is spaced for eccentric relative rotation of the gears. It will be observed that outer gear 10 is of generally tubular shape with conical parallel inside and outside surfaces, and that it is somewhat thicker than inner gear 12 which has a conical peripheral surface 20 substantially parallel to inside surface 19 of gear 10, along which surfaces the cooperating or mating gear teeth are cut.

Outer gear 10 is preferably held against rotation but is nevertheless movable in the longitudinal direction relative to gear 12. To this end, gear 10 is connected by an arm 30 to a member 28 having an opening 32 through which a shaft 44, sharing axis 17 of gear 10, extends. Opening 32 retains a bearing 35 fastened to a conical element 39, each having a central hole 41 for receiving shaft 44 with sufficient tolerance to permit freedom of rotation of the shaft therein despite selective longitudinal translation of outer gear 10, arm 30, member 28 and the associated captive members 35 and 39.

A block 47 is rigidly attached to the end of shaft 44 adjacent gears 10 and 12, and has a channel 48 milled therein to slidably receive a component 50. The latter includes a shaft 53 journaled along axis 15 into a hub on which inner gear 12 is free to rotate, and further includes an extension 55 having an inclined conical peripheral surface 58 that mates with the surface of conical element 39 (see FIG. 3).

The structure thus far described operates in the following manner. As shaft 44 rotates, for example by virtue of its coupling to a driving member such as a motor at its other end, channel member or block 47 drives component 50 in revolution about axis 17. Shaft 53 follows the motion of component 50, describing a circular path 60 about axis 17 and forcing the teeth 24 of inner ring gear 12 to mesh with teeth 22 of outer gear 10 along a limited region of engagement. The region along which the gears mesh travels about the interior surface of gear 10 as shaft 53 revolves, with gear 12 rotating freely on the hub in eccentric motion about axis 17 to produce this moving region of meshing.

To vary the ratio of reduction of the gears, outer gear 10 is moved longitudinally in an appropriate direction (i.e., upwardly or downwardly as viewed in (FIGS. 2 and 3), depending upon desired gear ratio, thereby bringing conical element 39 along with it. For example, if gear 10 is moved downwardly, as is the situation in the operational sequence of the apparatus from FIG. 2 to FIG. 3, element 39 forces extension member 55 radially outwardly as the two larger diameter portions of those components approach each other. The increase of the effective diameter of outer gear 10 relative to the longitudinal position of inner gear 12, the, is without loss of continuous meshing of the two gears along the aforementioned limited region by virtue of the corresponding separation between axes 15 and 17 as shaft 53 (and consequently, gear 12) follows the radial movement of extension 55.

Similarly, if the direction of longitudinal movement is reversed, the effective inner diameter of gear 10 is reduced with respect to the outer diameter of gear 12, but the latter gear is forced inwardly by the biasing action of the former in its upward path and by the corresponding upward movement of cone 39.

Since the ratio of reduction of the gears varies directly and significantly with the effective diameter of outer gear 10, even a slight change of that diameter can produce a large change in gear ratio and hence in output shaft speed. The rotation of inner gear 12 may be transferred to an output shaft 81 (FIG. 3) in any convenient manner, such as by the use of cardanic connections in which a circular member 72 fastened to inner gear 12 about axis 15 is connected to a splined expansion shaft having members 77, 79 via ring 74. A further ring 78 couples shaft member 79 to output shaft 81. In addition to transferring variable speed rotation of inner gear 12 to output shaft 81, this arrangement compensates for varying degrees of eccentricity of rotation of that gear relative to axis 17.

It may occur, in the event of high speed rotation of gear 12 with great eccentricity, and of a considerable mass for that gear, that excessive vibration is experienced; vibration that could result in failure of the transmission system. In order to damp that vibration without substantially reducing the efficiency of the system, my present invention provides a counteracting or compensating mass whose radial location relative to the center of mass of gear 12 and related elements depends on the degree of eccentricity of the gear rotation. To that end, a mass or weight 90 is coupled to component 50 and is constrained to move radially relative to axis 17 in a direction and at a distance opposite that of component 50.

Mass 90 may simply be a cylindrical block having a central hole for receiving a rod 91 fastened to channel member 47. The tolerance between the central hole and rod 91 should be such that mass 90 can slide freely on the rod. The coupling between mass 90 and component 50, or with any other element connected for corresponding movement with component 50, may conveniently be provided by a conventional extensible-collapsible coupler 93 comprising four rods hinged together in a parallelogram configuration. Opposite lateral (relative to the aforementioned longitudinal axis of the overall system) pivot pins or hinge pins 94, 95 of coupler 93 are fastened to arms 96, 97, respectively fixedly connected to component 50 and to mass 90. A third pivot or hinge pin 98 is arranged to undergo confined longitudinal movement within a channel or groove 99 milled in the body of member 47.

Figure 2:
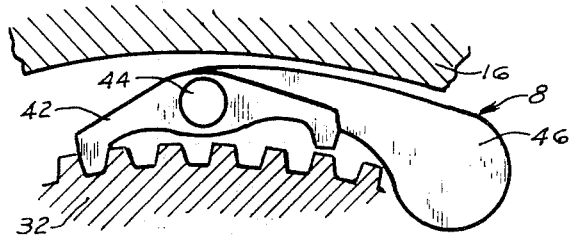
FIG. 2 is a side view of the transmission of FIG. 1.

In operation, as is shown most clearly in the sequence of FIGS. 2 and 3, coupler 93 is in its compressed or collapsed state at those times when the eccentricity of rotation of gear 12 is least pronounced, i.e., when the axes 15 and 17 are closest together, and hence, when component 50 is most completely mated with channel 48. Outward (radial) movement of component 50, accompanying downward movement of gear 10, however, results in lateral extension of coupler 93 and, with it, corresponding outward movement of mass 90. Accordingly, it will be observed that greater eccentricity of inner gear 12 produces larger displacement of mass 90, whereas reduction of eccentricity is accompanied by decreased displacement of mass 90. Since the mass 90 revolves about axis 17 at different radial positions depending upon degree of eccentricity of gear 12, it counteracts (i.e., damps) the vibration which would ordinarily occur at each lateral displacement of the inner gear and which is most severe at its most extreme departure from axis 17. That is to say, the present invention provides continual compensation against vibration irrespective of the variation in gear ratio or of the mass of the inner gear and connected components.

While some shear stress is introduced with respect to elements 44, 47 and 50 as a result of the difference in planes of rotation of gear 12 and mass 90, the materials of which those elements are composed are readily selectable to withstand such stresses.

I claim:

1. A stepless variable speed transmission system, comprising:
    an external ring gear of hollow and generally frustoconical configuration having a toothed interior wall encircling a central longitudinal axis of said external ring gear;
    an internal ring gear having a toothed exterior wall of generally frustoconical configuration and of smaller diameter than the diameter of the interior wall of said external ring gear, said internal ring gear being rotatable about its central longitudinal axis and being disposed interiorly of said external ring gear to permit engagement between said toothed interior and exterior walls when said central longitudinal axes are disposed parallel to one another and displaced from one another by a predetermined distance equal to the difference between the diameters of said toothed exterior and interior walls;
    a driving shaft extending coaxially with and arranged to be rotated about the central longitudinal axis of said external ring gear;
    a further shaft journaled in said internal ring gear and extending coaxially with the central longitudinal axis of said internal ring gear;
    coupling means fixedly secured to said driving shaft for rotation therewith, said coupling means including means for supporting said further shaft at all times parallel to said driving shaft and transversely displaced therefrom by said predetermined distance such that said further shaft revolves about the central longitudinal axis of said external ring gear in response to rotation of said rotating shaft about the same axis whereby said interior and exterior toothed surfaces are at all times engaged;
    means for selectively translating said internal ring gear along its central longitudinal axis and relative to said external ring gear to permit selective variation of the engaged portions of said interior and exterior toothed walls, and
    compensating means for counteracting vibration within said system resulting from eccentric rotation of said internal ring gear about the central longitudinal axis of said external ring gear, said compensating means including means responsive to variation in the degree of said eccentric rotation for providing proportionate variation in said counteracting vibration;
    wherein said compensating means comprises:
        a rod secured to said means for supporting and extending perpendicular to said driving shaft and on the opposite side of said driving shaft from said further shaft;
        a mass slidably mounted on said rod; and
        means for sliding said mass along said rod toward and away from said driving shaft in response to corresponding motion of said further shaft toward and away from said driving shaft, respectively.